(12) United States Patent
Takase

(10) Patent No.: US 9,344,699 B2
(45) Date of Patent: May 17, 2016

(54) INFORMATION PROCESSING APPARATUS, INFORMATION PROCESSING METHOD, AND PROGRAM

(71) Applicant: SONY CORPORATION, Tokyo (JP)

(72) Inventor: Tsunemitsu Takase, Tokyo (JP)

(73) Assignee: SONY CORPORATION, Tokyo (JP)

( * ) Notice: Subject to any disclaimer, the term of this patent is extended or adjusted under 35 U.S.C. 154(b) by 196 days.

(21) Appl. No.: 14/017,500

(22) Filed: Sep. 4, 2013

(65) Prior Publication Data

US 2014/0099072 A1   Apr. 10, 2014

(30) Foreign Application Priority Data

Oct. 10, 2012   (JP) .................................. 2012-225398

(51) Int. Cl.

| | |
|---|---|
| *H04N 9/87* | (2006.01) |
| *H04N 5/76* | (2006.01) |
| *H04N 9/82* | (2006.01) |
| *H04N 21/237* | (2011.01) |
| *H04N 21/432* | (2011.01) |
| *H04N 21/433* | (2011.01) |
| *H04N 21/81* | (2011.01) |
| *H04N 21/8352* | (2011.01) |
| *H04N 21/84* | (2011.01) |
| *H04N 21/845* | (2011.01) |
| H04N 5/765 | (2006.01) |

(52) U.S. Cl.
CPC . *H04N 9/87* (2013.01); *H04N 5/76* (2013.01); *H04N 9/8205* (2013.01); *H04N 21/237* (2013.01); *H04N 21/4325* (2013.01); *H04N 21/4334* (2013.01); *H04N 21/812* (2013.01); *H04N 21/8352* (2013.01); *H04N 21/84* (2013.01); *H04N 21/845* (2013.01); *H04N 21/8455* (2013.01); *H04N 21/8456* (2013.01); *H04N 5/765* (2013.01)

(58) Field of Classification Search
CPC ... H04N 5/76; H04N 21/4325; H04N 21/812; H04N 21/84
See application file for complete search history.

(56) References Cited

U.S. PATENT DOCUMENTS

2008/0187294 A1* 8/2008 Kobayashi .................... 386/124
2008/0228848 A1* 9/2008 Takahashi ..................... 709/201

FOREIGN PATENT DOCUMENTS

JP         2003-274353 A    9/2003

* cited by examiner

*Primary Examiner* — Huy T Nguyen
(74) *Attorney, Agent, or Firm* — Hazuki International, LLC

(57) ABSTRACT

Provided is an information processing apparatus including a recording unit, a chapter generation unit, a metadata acquisition unit, and a setting unit. The recording unit is configured to record a program. The chapter generation unit is configured to generate one or more chapter points based on a feature amount of the recorded program. The metadata acquisition unit is configured to acquire metadata on the program, that includes information on a start time and end time of each section sectioning the program. The setting unit is configured to allocate, when a section to be reproduced in the recorded program is designated, two different chapter points to a start time and end time of the section given by the acquired metadata, and set an interval between the two chapter points as a reproduction range of the designated section.

9 Claims, 13 Drawing Sheets

| Section name in post metadata | Section start time in post metadata (= section end time of section right before current section) [min:sec] | Chapter point [min:sec:frame] | Reproduction start time [min:sec:frame] |
|---|---|---|---|
| CM 1 | 0:00 | 0:00:00 | 0:00:00 |
| Theme song | 0:30 | 0:29:10 | 0:29:10 |
| Main story slot 1 | 2:00 | 1:59:24 | 1:59:24 |
| Main story slot 2 | 5:16 | — | 5:13:20 |
| CM 2 | 10:00 | 10:03:03 | 10:03:03 |
| Main story slot 3 | 11:30 | 11:29:15 | 11:29:15 |
| Main story slot 4 | 15:00 | 14:58:00 | 14:58:00 |

INFORMATION PROCESSING APPARATUS, INFORMATION PROCESSING METHOD, AND PROGRAM

CROSS REFERENCE TO RELATED APPLICATION(S)

This application claims the benefit of Japanese Priority Patent Application JP 2012-225398 filed on Oct. 10, 2012, the entire contents of which are incorporated herein by reference.

BACKGROUND

The present disclosure relates to an information processing apparatus, an information processing method, and a program with which broadcast programs can be recorded and reproduced.

In recent years, recording apparatuses capable of accepting a reproduction instruction from a user in a program scene unit and reproducing it have appeared. For making a search in a program scene unit possible, the recording apparatus carries out processing of, for example, adding an index to a scene change point in a recorded program in advance. As a typical method of detecting a scene change point in a program, there is a method of calculating video and audio feature amounts and setting a point whose feature amount exceeds a threshold value as a scene change point.

Japanese Patent Application Laid-open No. 2003-274353 (hereinafter, referred to as Patent Document 1) discloses a technique for mapping, with program data that a personal computer has acquired via a network being a target, event information manually created for each scene unit, for example, on a time axis of the actual stored program data. In the technique disclosed in Patent Document 1, times of a plurality of scene change points indicated by the event information are compared one by one with times of a plurality of scene change points detected based on the video and audio feature amounts of the program data, and the number of times the times match is counted. Such a comparison is repeated while shifting one by one a time at a head of the times to be compared with the times of the scene change points indicated by the event information in a set of times of the plurality of scene change points detected based on the feature amounts. A compared combination having a highest count value through the repetition is judged as a combination having intervals among the scene change points matching at a highest rate, that is, a synchronized combination.

SUMMARY

In recent years, in addition to standard program information (SI: Service Information) delivered with a broadcast program, a service for manually creating more-specific information on a broadcast program and delivering it to a viewer's apparatus has started. The more-specific information on a broadcast program is called "post metadata". The post metadata is manually created as a staff views a broadcast program. The post metadata is constituted of specific data including CMs, a main story, scenes of the main story, a start time and end time of each temporal section such as a slot, a field, casts, and a general outline constituting a program.

However, since the post metadata is manually-created data, accuracy of information on, for example, the start time and end time of each section is insufficient. Therefore, when assuming a case of using post metadata in reproducing a broadcast program recorded in a recording apparatus in a section unit, there are still problems to be addressed.

In this regard, there is a need for an information processing apparatus, an information processing method, and a program with which a recorded program can be favorably reproduced.

According to an embodiment of the present disclosure, there is provided an information processing apparatus including a recording unit, a chapter generation unit, a metadata acquisition unit, and a setting unit. The recording unit is configured to record a program. The chapter generation unit is configured to generate one or more chapter points based on a feature amount of the recorded program. The metadata acquisition unit is configured to acquire metadata on the program, that includes information on a start time and end time of each section sectioning the program. The setting unit is configured to allocate, when a section to be reproduced in the recorded program is designated, two different chapter points to a start time and end time of the section given by the acquired metadata, and set an interval between the two chapter points as a reproduction range of the designated section.

The setting unit may set, as a start time of the reproduction range, a first chapter point closest to the start time of the designated section within a range set by adding a predetermined first time period before and after the start time of the designated section, and set, as an end time of the reproduction range, a second chapter point closest to the end time of the designated section within a range set by adding a predetermined second time period before and after the end time of the designated section.

The setting unit may set, as the start time of the reproduction section, when the first chapter point does not exist within the range set by adding the predetermined first time period before and after the start time of the designated section, a point having a maximum feature amount value within a range set by adding a predetermined third time period before and after the start time of the designated section, and set, as the end time of the reproduction section, when the second chapter point does not exist within the range set by adding the predetermined second time period before and after the end time of the designated section, a point having a maximum feature amount value within a range set by adding a predetermined fourth time period before and after the end time of the designated section.

In the information processing apparatus, it is desirable for the first time period added before the start time of the designated section to be longer than the first time period added after the start time of the designated section, and the second time period added before the end time of the designated section to be shorter than the second time period added after the end time of the designated section.

In the information processing apparatus, it is desirable for the third time period added before the start time of the designated section to be longer than the third time period added after the start time of the designated section, and the fourth time period added before the end time of the designated section to be shorter than the fourth time period added after the end time of the designated section.

The chapter generation unit may generate, with a plurality of commercials successively inserted into the program being set as one CM section, at least the one or more chapter points at a start point and end point of the CM section.

The information processing apparatus may further include a section selection screen generation unit configured to generate, based on the acquired metadata, a selection screen for prompting a user to select a section to be reproduced in the recorded program.

According to another embodiment of the present disclosure, there is provided an information processing method including: generating, by a chapter generation unit, one or more chapter points based on a feature amount of a program; acquiring, by a metadata acquisition unit, metadata on the program, that includes information on a start time and end time of each section sectioning the program; and allocating, by a setting unit, when a section to be reproduced in the program recorded in an information processing apparatus is designated by a user, two different chapter points to a start time and end time of the section given by the acquired metadata, and setting an interval between the two chapter points as a reproduction range of the designated section.

According to another embodiment of the present disclosure, there is provided a program that causes a computer to function as a chapter generation unit, a metadata acquisition unit, and a setting unit. The chapter generation unit is configured to generate one or more chapter points based on a feature amount of a program. The metadata acquisition unit is configured to acquire metadata on the program, that includes information on a start time and end time of each section sectioning the program. The setting unit is configured to allocate, when a section to be reproduced in the program recorded in an information processing apparatus is designated, two different chapter points to a start time and end time of the section given by the acquired metadata, and set an interval between the two chapter points as a reproduction range of the designated section.

As described above, according to the embodiments of the present disclosure, a recorded program can be reproduced favorably.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a diagram showing section names given by the post metadata and relationships among section start times, chapter points, and reproduction start times;

FIG. 11 is a diagram showing an example of a correlation among section information, shop information, product information, and CM information of the sections given by post metadata on the time axis according to a modified example;

DETAILED DESCRIPTION OF EMBODIMENTS

Hereinafter, an embodiment of the present disclosure will be described with reference to the drawings.

<First Embodiment>

Figure 1:
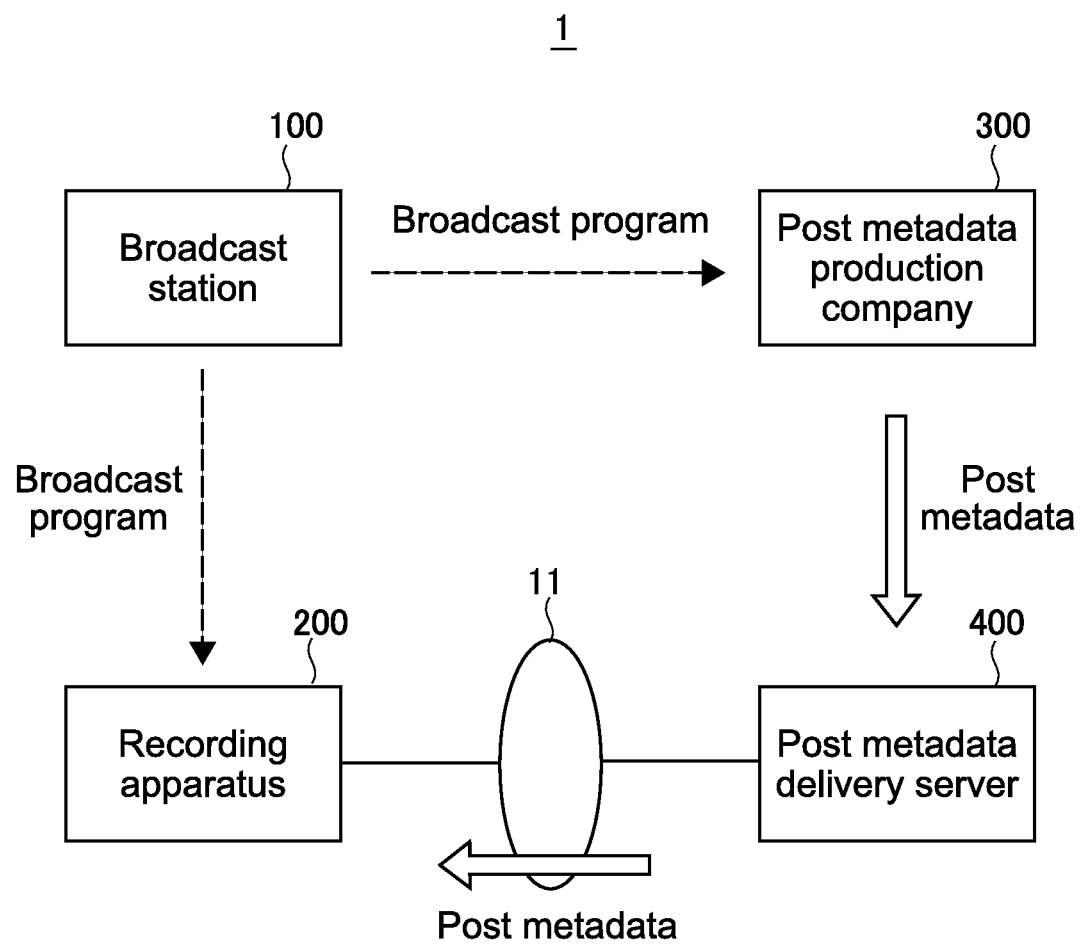
FIG. 1 is a diagram showing a structure of a system according to a first embodiment of the present disclosure.

FIG. 1 is a diagram showing a structure of a system according to a first embodiment of the present disclosure.

The system 1 includes a broadcast station 100 that broadcasts programs, a recording apparatus 200 that records the broadcasted programs (broadcast programs), a post metadata production company 300 that produces post metadata of the broadcast programs, and a post metadata delivery server 400 that delivers the post metadata via a network 11 such as the Internet.

The post metadata production company 300 manually creates post metadata of a broadcast program and supplies it to the post metadata delivery server 400.

The post metadata delivery server 400 is a server that manages the post metadata of a broadcast program created by the post metadata production company 300 and provides a service of delivering the post metadata in response to a request from the recording apparatus 200.

The recording apparatus 200 is capable of receiving, recording, and reproducing broadcast programs. It should be noted that the recording apparatus 200 may be a recording-only apparatus, a recording/reproducing apparatus, or a recording/reproducing module incorporated into a television receiver 15. Alternatively, the recording apparatus 200 may be a personal computer or a mobile terminal having a recording function as well as a telephone function. In other words, the apparatuses are collectively called information processing apparatus.

Figure 2:
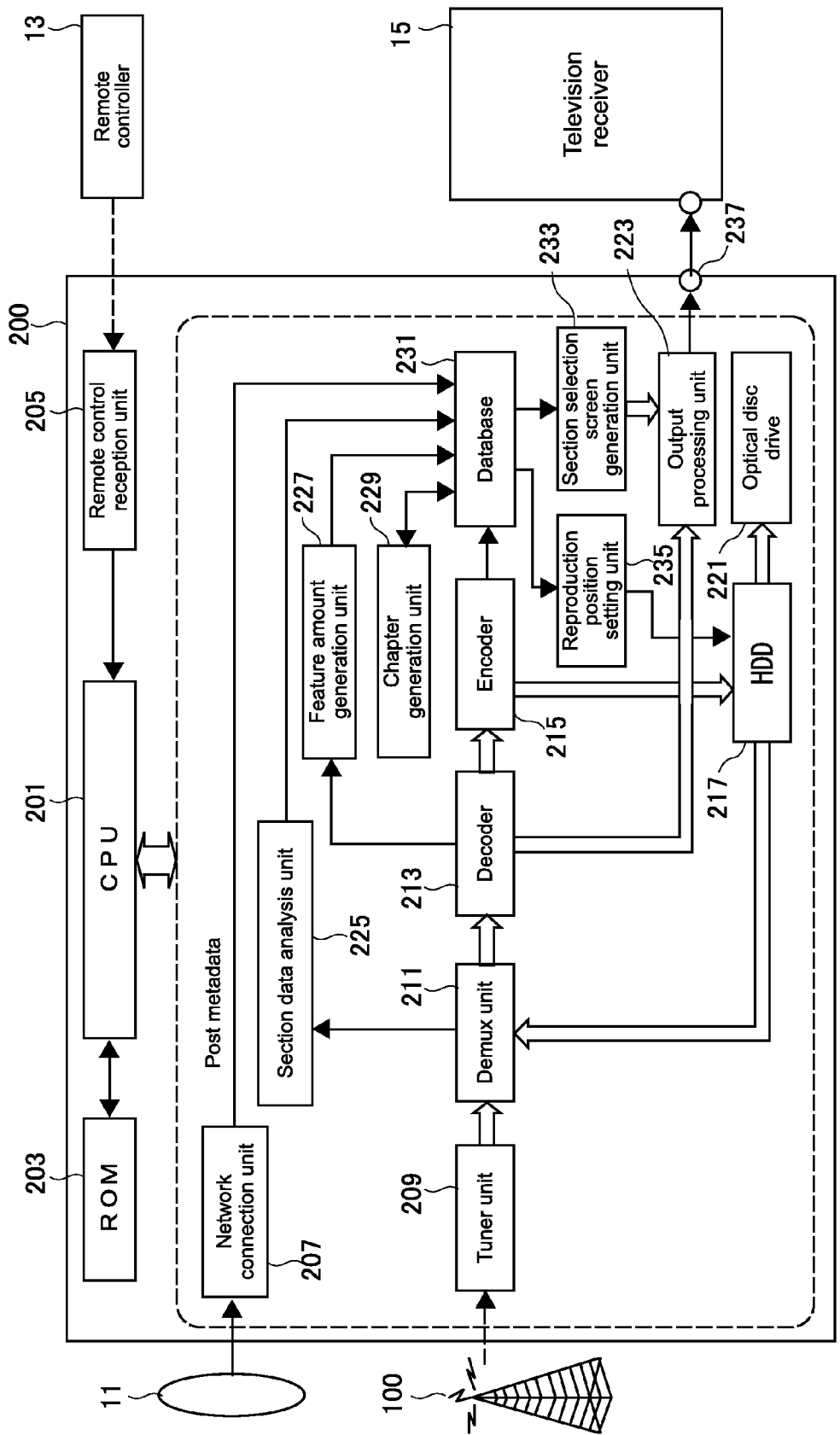
FIG. 2 is a block diagram showing a functional structure of a recording apparatus shown in FIG. 1.

FIG. 2 is a block diagram showing a functional structure of the recording apparatus 200.

The recording apparatus 200 includes a CPU (Central Processing Unit) 201, a ROM (Read Only Memory) 203, a remote control reception unit 205, a network connection unit 207, a tuner unit 209, a Demux unit 211, a decoder 213, an encoder 215, an HDD (Hard Disk Drive) 217, an optical disc drive 221, an output processing unit 223, a section data analysis unit 225, a feature amount generation unit 227, a chapter generation unit 229, a database 231, a section selection screen generation unit 233, and a reproduction position setting unit 235.

The CPU 201 performs overall control and information processing of the recording apparatus 200, and the like.

The ROM 203 is a storage that stores programs to be executed by the CPU 201 and various types of data.

The remote control reception unit 205 receives a remote control signal from a remote controller 13 operating the recording apparatus 200, generates code data interpretable by the CPU 201, and supplies it to the CPU 201.

The network connection unit 207 is an interface for connecting with the network 11 such as the Internet. The CPU 201 connects to the post metadata delivery server 400 using the network connection unit 207 and acquires post metadata from the post metadata delivery server 400. In other words, the network connection unit 207 and the CPU 201 function as a metadata acquisition unit.

The tuner unit 209 selects a broadcast program. Specifically, the tuner unit 209 selects a broadcast signal of a carrier frequency selected from broadcast waves of, for example, digital terrestrial broadcast, BS digital broadcast, and CS digital broadcast, demodulates the broadcast signal, generates a broadcast transport stream, and supplies it to the Demux unit 211.

The Demux unit 211 separates packets of a video stream, audio stream, and section data (e.g., PSI/SI: Program Specific Information/Service Information) multiplexed to a broadcast transport stream based on a packet identifier (PID: Packet Identifier) described in a header portion of each packet. The video stream and audio stream separated by the Demux unit 211 are supplied to the decoder 213, and the section data is supplied to the section data analysis unit 225.

The decoder 213 decodes the video stream and audio stream. The decoded video data and audio data are supplied to the output processing unit 223, the encoder 215, and the feature amount generation unit 227.

The encoder 215 converts the decoded video data and audio data into compressed video data and audio data to form a packet, and thus generates a partial transport stream.

The HDD 217 is a storage in which the partial transport stream is stored and read out (corresponds to recording unit).

The optical disc drive 221 is a drive for recording, onto a detachable optical disc such as a Blu-ray (registered trademark) disc, recording data.

The output processing unit 223 generates a signal processible by the television receiver 15 from the video data and audio data decoded by the decoder 213 and outputs the signal to the television receiver 15 via a digital interface 237 such as an HDMI (High-Definition Multimedia Interface).

The section data analysis unit 225, the feature amount generation unit 227, the chapter generation unit 229, the database 231, the section selection screen generation unit 233, and the reproduction position setting unit 235 are realized by the CPU 201 executing programs stored in the ROM 203 on a main memory (not shown).

The section data analysis unit 225 analyzes section data and extracts and stores data on a broadcast program such as a program name, content, casts, and genre information in the database 231.

The feature amount generation unit 227 analyzes the decoded video data and audio data, generates feature amounts requisite for detecting, as chapter points, change points of scenes, slots, and the like in a main story of a broadcast program and a start point and end point of a commercial (hereinafter, referred to as CM), and stores the feature amounts in the database 231 in association with time information on the broadcast program. For example, the feature amount of video data is generated based on a difference between frames and the like. The feature amount of audio data is generated based on a volume level, a change amount thereof, a silent point, and the like.

The chapter generation unit 229 generates, as chapter points, based on the feature amounts stored in the database 231, change points of scenes, slots, and the like in a main story of a broadcast program and a start point and end point of a CM and stores them in the database 231. A specific method of generating a chapter point will be described later.

The database 231 stores section data generated by the section data analysis unit 225, a pair of a feature amount generated by the feature amount generation unit 227 and time information on a broadcast program, all chapter points generated by the chapter generation unit 229, and the like. The database 231 also stores post metadata acquired from the post metadata delivery server 400.

The section selection screen generation unit 233 generates, based on the post metadata stored in the database 231, a reproduction section selection screen for prompting a user to select a section to reproduce in a recorded broadcast program.

The reproduction position setting unit 235 (setting unit) allocates two different chapter points to a section start time and section end time of a section, that are given by the post metadata stored in the database 231, and sets an interval between the two chapter points as a reproduction range of the section selected by the user.

(Post Metadata)

As described above, post metadata is metadata that is manually created as a staff of the post metadata production company 300 actually views a broadcast program.

Figure 3:
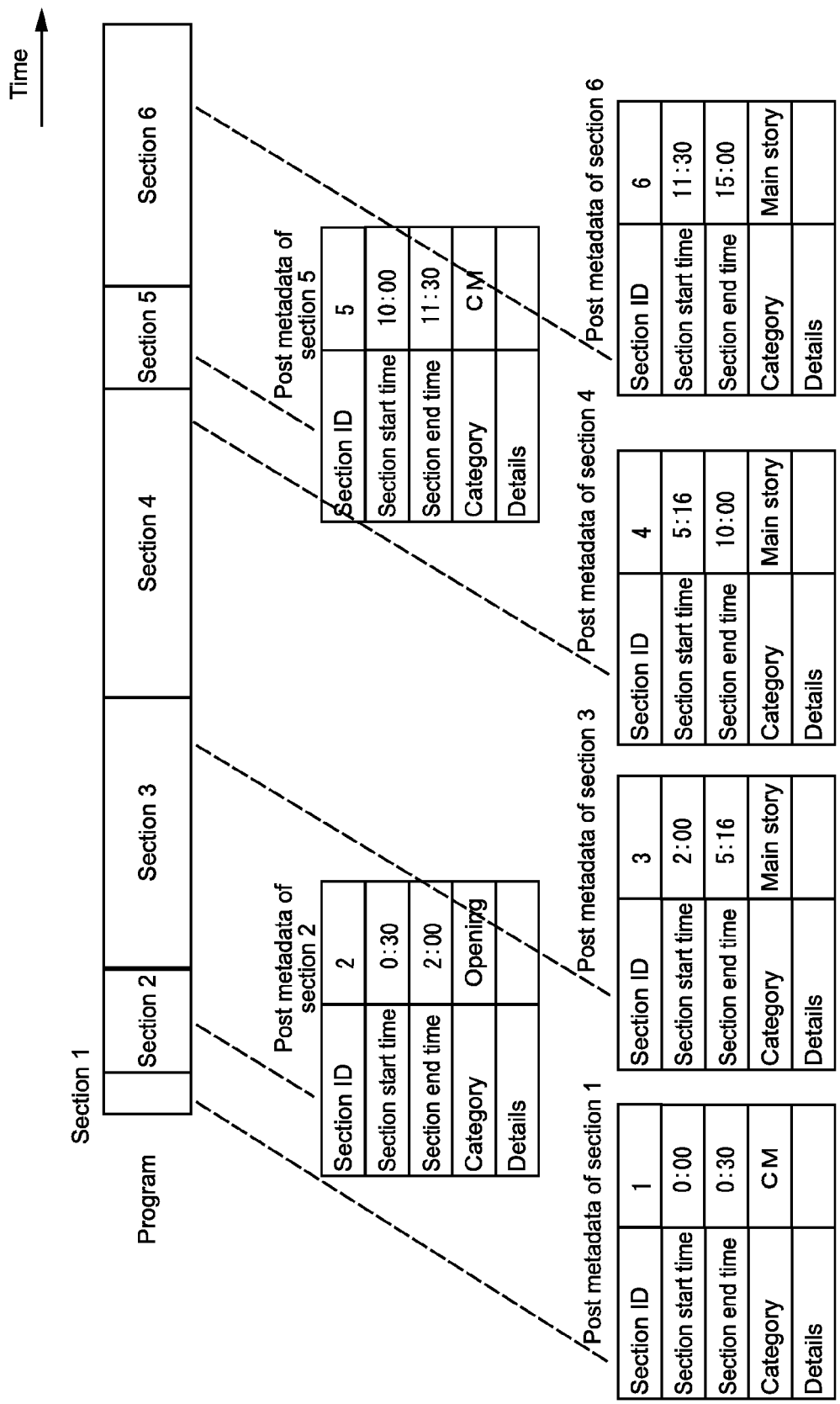
FIG. 3 is a diagram showing a structure of post metadata of each section of a program.

FIG. 3 is a diagram showing a structure of post metadata of each section of a broadcast program.

A broadcast program can be sectioned into several parts such as a CM, a main story, and scenes or slots in the main story. Post metadata of each section of a broadcast program is created by generating sections of the broadcast program as a staff actually views the broadcast program and manually generating, for example, section IDs, section start times, section end times, categories, details, and the like with respect to the generated sections. Here, the section ID is information for identifying each section in the broadcast program. The section start time is a start time of a section. The section end time is an end time of a section. The section start time and section end time are displayed in minutes/seconds. The category is a CM, opening, ending, main story, and the like. The details are specific information of each section such as a name of a person, a slot name, a product name, a remark content, a condition, and location information.

It should be noted that the post metadata of each section in a broadcast program may be provided while including program metadata such as a program name, a broadcast station, a broadcast date, a program start time, a program end time, and a program ID, or may be linked with the program metadata using the program ID. Here, as the program ID, by using the program ID for identifying a broadcast program in the SI as it is, a correlation between data on the broadcast program described in the SI and the post metadata for each section can be secured.

The post metadata for each section of a broadcast program is acquired by the recording apparatus 200 automatically transmitting a request for post metadata to the post metadata delivery server 400 in a certain cycle such as every day and every week. Alternatively, the request for post metadata may be transmitted from the recording apparatus 200 to the post metadata delivery server 400 right after recording of a broadcast program is completed. A unit in which post metadata is acquired may be any of, for example, a program unit, a channel unit, and an all-channel unit. It is possible for the cycle, timing, and unit with which the user acquires the post metadata to be set arbitrarily. Considering a load of the post metadata delivery server 400, the post metadata may be acquired after requesting the post metadata delivery server 400 when generating a reproduction section selection screen of a recorded title.

(Method of Generating Chapter Point)

Next, a method of generating a chapter point by the recording apparatus 200 of this embodiment will be described.

The chapter generation unit 229 generates a chapter point as follows based on a feature amount stored in the database 231.

1. The chapter generation unit 229 generates, as a chapter point, a change point having a large feature amount in a video, that is, a change point in which a difference between frames is equal to or larger than a threshold value. The chapter point is expressed by minutes, seconds, and a frame count.

2. When a plurality of CMs successively inserted between main stories are to be generated as one CM section, the chapter generation unit 229 checks intervals of change points with large feature amounts in a video across a range set by adding a predetermined time (about several minutes) before and after each of the change points. The chapter generation unit 229 judges a section in which the change point repeatedly appears outside a range of a different predetermined time (interval of several ten seconds) as the CM section, and generates a first change point and a last change point in the CM section as the chapter points (see, for example, change of feature amount of CM section in FIG. 9).

3. When confirming that a target broadcast program is a music program based on genre information of the broadcast program included in section data, the chapter generation unit 229 switches from a mode for generating a chapter point based on a video feature amount to a mode for generating a chapter point based on an audio feature amount. In this mode, the chapter generation unit 229 generates, as a chapter point, a start point of a portion where a volume level gradually increases or a point where the volume level gradually decreases to become an almost-silent state. In a music program, a cut is switched within a short time as compared to broadcast programs of other genres. Therefore, it is highly likely that a plurality of chapter points are generated in one song. If the chapter point is generated based on the audio feature amount, the chapter point is not generated excessively. In other words, the possibility of the chapter point being generated only at the start point and end point of one song becomes high, and thus accuracy in generating a chapter point is improved.

It should be noted that the method 3 above may be introduced as a method of narrowing down candidates of one or more chapter points generated based on the video feature amount to a probable chapter point.

Heretofore, the method of generating a chapter point has been described.

(Operation of Setting Reproduction Range of Section Given by Post Metadata)

Next, an operation of allocating, as a reproduction start position and a reproduction end position, two chapter points to a section start time and section end time of a section given by post metadata and setting a reproduction range of the section will be described.

First, a purpose of this operation will be described.

Temporal accuracy of the chapter points generated based on the feature amount is sufficiently higher than that of the section start time and section end time given by the manually-created post metadata. On the other hand, while the chapter point generated based on the feature amount is merely time information, the post metadata includes information that helps the user recognize a program content of the section, such as a category and details, with respect to the section. In this regard, by prompting the user to select a section to reproduce from the section given by the post metadata, and allocating, as the reproduction start position and reproduction end position, two chapter points having high temporal accuracy to the section start time and section end time given by the post metadata for the selected section to thus reproduce the selected section, it is possible to realize both of an improvement in a user operability in instructing a section reproduction and an improvement in accuracy of a reproduction section.

Next, a more-specific operation will be described.

While selecting a broadcast program recorded in the recording apparatus 200, the user performs an operation of instructing display of a reproduction section selection screen of the broadcast program using, for example, the remote controller 13. The remote control reception unit 205 of the recording apparatus 200 receives a remote signal transmitted from the remote controller 13. The remote signal includes a program ID of the selected broadcast program. The remote control reception unit 205 converts the received remote signal into a reproduction section selection screen display command interpretable by the CPU 201, and supplies it to the CPU 201.

Upon receiving the reproduction section selection screen display command, the CPU 201 operates the section selection screen generation unit 233. The section selection screen generation unit 233 reads out post metadata of the broadcast program from the database 231 based on the program ID included in the reproduction section selection screen display command. Based on the readout post metadata, the section selection screen generation unit 233 creates reproduction section selection screen data and outputs it to the output processing unit 223. The output processing unit 223 generates a video signal in a format that can be displayed on the television receiver 15 from the reproduction section selection screen data and supplies it to the television receiver 15 connected via the digital interface 237.

Figure 4:
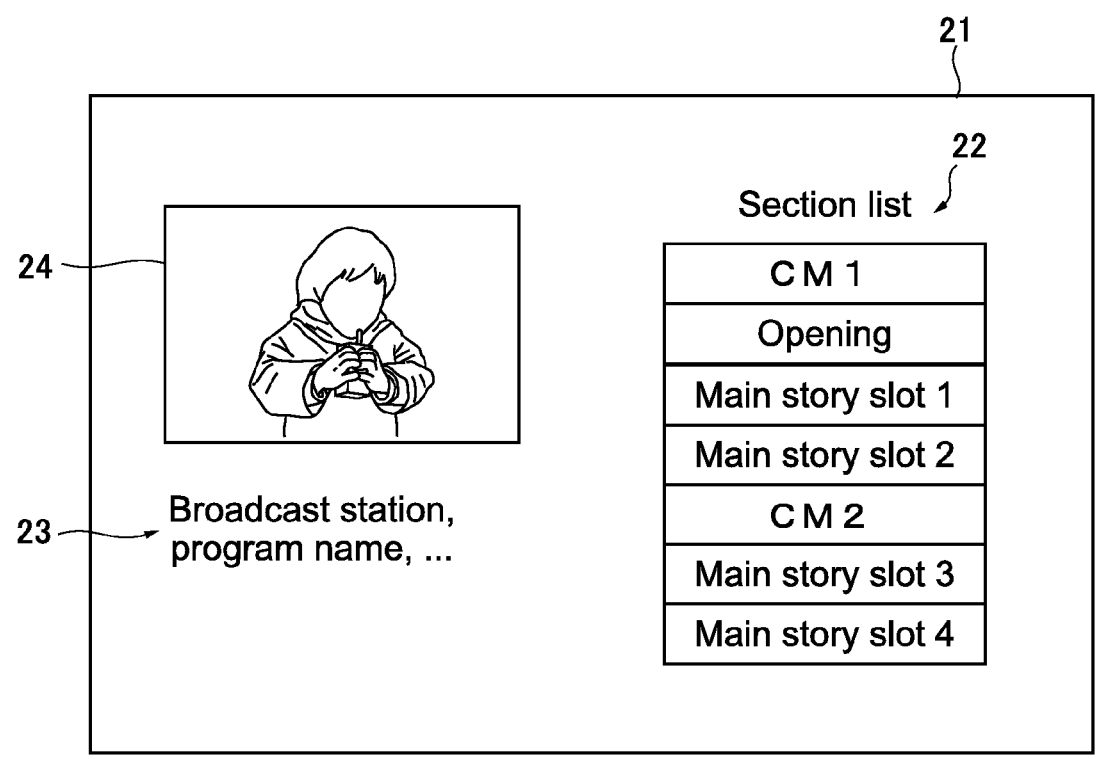
FIG. 4 is a diagram showing an example of a reproduction section selection screen.

FIG. 4 is a diagram showing an example of the reproduction section selection screen.

On a reproduction section selection screen 21, a section list 22 is displayed. The section list 22 is a list created by imparting a section name obtained based on information including, for example, a category and details in post metadata to one or more sections constituting a broadcast program. The sections are arranged as selection items in a certain direction in time series (longitudinal direction in FIG. 4). By operating the remote controller 13 or the like, the user can arbitrarily select a section corresponding to a section name that the user wishes to reproduce from the section list 22.

Displayed on the reproduction section selection screen 21 are, in addition to the section list 22, information 23 extracted from section data or post metadata, such as a broadcast date, a broadcast station name, a program name, a program start time, and a program end time. A thumbnail image 24 of a broadcast program, and the like are also displayed on the reproduction section selection screen 21.

When an arbitrary section is selected by the user operating the remote controller 13 or the like in the reproduction section selection screen 21, the remote control reception unit 205 of the recording apparatus 200 receives a remote signal transmitted from the remote controller 13. The remote signal includes a section ID of the section selected by the user. The remote control reception unit 205 converts the received remote signal into reproduction section selection information interpretable by the CPU 201 and supplies it to the CPU 201. The reproduction section selection information includes the section ID of the section selected by the user.

The CPU 201 operates the reproduction position setting unit 235 upon receiving the reproduction section selection command.

Figure 5:
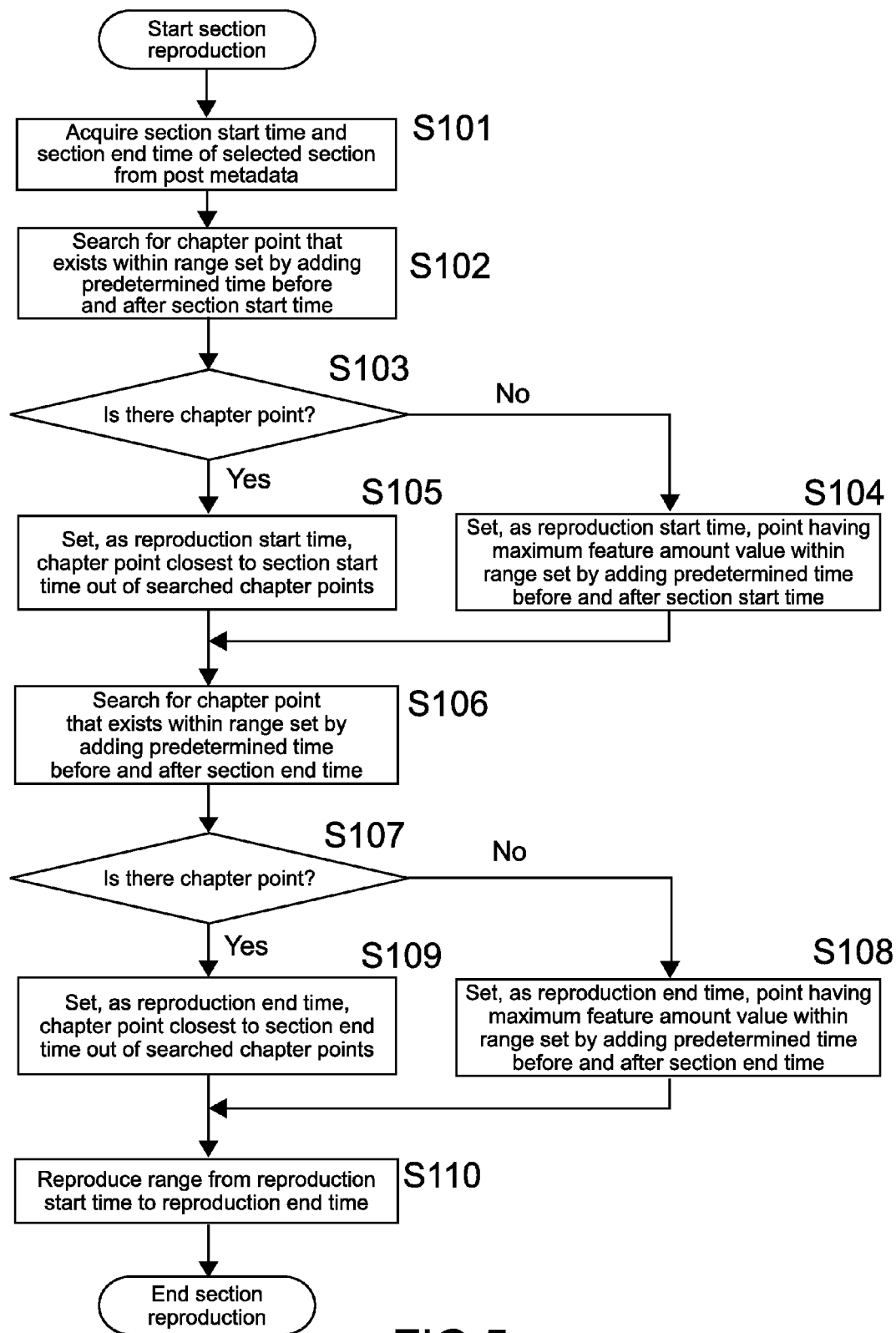
FIG. 5 is a flowchart showing an algorithm of a reproduction position setting unit.

FIG. 5 is a flowchart showing an algorithm of the reproduction position setting unit 235.

The CPU 201 operates the reproduction position setting unit 235 upon receiving the reproduction section selection information. The reproduction position setting unit 235 searches for post metadata stored in the database 231 based on the already-given program ID and the section ID included in the reproduction section selection information and acquires a section start time and section end time of the relevant section (Step S101).

Next, the reproduction position setting unit 235 searches for a chapter point that exists within a range obtained by adding a predetermined time (first time period) before and after the section start time (Step S102).

Figure 6:
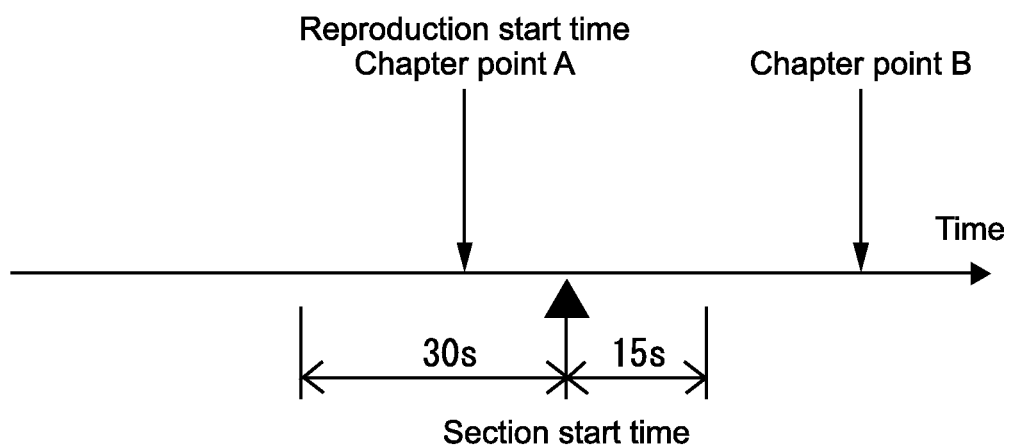
FIG. 6 is a diagram showing a search range of a chapter point with respect to a section start time.

Here, in the chapter point search range, time lengths of the search range (first time period) added before and after the section start time may be the same, but it is desirable to set the time length of the search range added before the section start time to be longer than that of the search range added after the section start time, like setting the time length of the search range added before the section start time to 30 seconds and setting the time length of the search range added after the section start time to 15 seconds as shown in FIG. 6, for example. This is because, when the reproduction is started from the middle, the user is required to perform an operation of setting back the reproduction position to the section start point.

When no chapter point is detected from the chapter point search range (NO in Step S103), the reproduction position setting unit 235 searches for a point having a maximum feature amount value (point excluding chapter point) within a range set by adding a predetermined time (third time period) before and after the section start time and sets the point as a reproduction start time. At this time, when points having the same feature amount value are detected before and after the section start time, the reproduction position setting unit 235 sets an earlier one of the points as the reproduction start time (Step S104).

Here, in the search range of a point having a maximum feature amount value, time lengths of the search range (third time period) added before and after the section start time may be the same, but it is desirable to set the time length of the search range added before the section start time to be longer than that of the search range added after the section start time, like setting the time length of the search range added before the section start time to 30 seconds and setting the time length of the search range added after the section start time to 15 seconds, for example.

It should be noted that the length of the search range of a point having a maximum feature amount value may be the same as that of the chapter point search range, or may be narrower or wider than the chapter point search range.

When a chapter point is detected from the chapter point search range (YES in Step S103), the reproduction position setting unit 235 sets the chapter point closest to the section start time as the reproduction start time (Step S105).

More specifically, the reproduction start time is set according to the following rules:
1. When a chapter point exists only in a search range before a section start time, that chapter point is set as a reproduction start time.
2. When a chapter point exists only in a search range after a section start time, that chapter point is set as a reproduction start time.
3. When chapter points exist in search ranges before and after a section start time, the chapter point closer to the section start time is set as a reproduction start time.
4. When lengths from a section start time regarding chapter points before and after the section start time are the same, the chapter point before the section start time is set as a reproduction start time.

The reproduction start time is set according to the rules described above.

Next, the reproduction position setting unit 235 searches for a chapter point that exists within a range set by adding a predetermined time (second time period) before and after the section end time given by the post metadata (Step S106).

Figure 7:
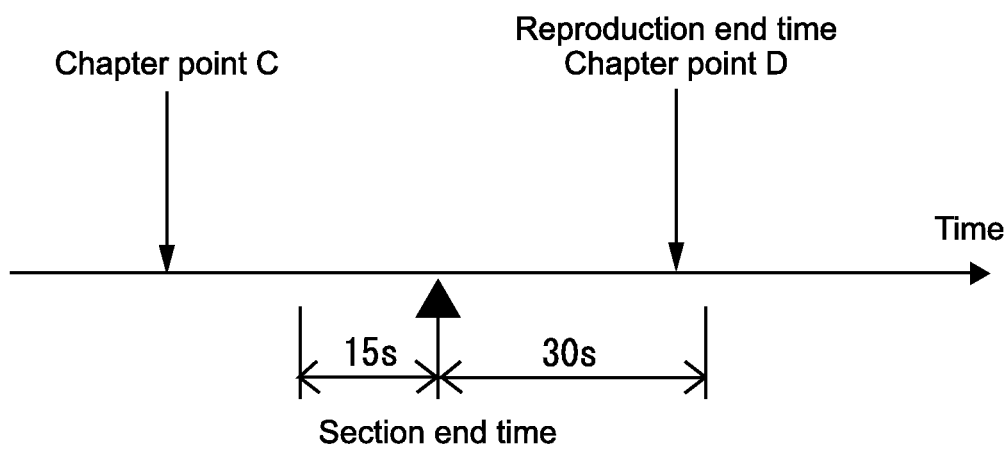
FIG. 7 is a diagram showing a search range of the chapter point with respect to a section end time.

Here, in the chapter point search range, time lengths of the search range (second time period) added before and after the section end time may be the same, but it is desirable to set the time length of the search range added after the section end time to be longer than that of the search range added before the section end time, like setting the time length of the search range added before the section end time to 15 seconds and setting the time length of the search range added after the section end time to 30 seconds as shown in FIG. 7, for example. This is for suppressing a possibility of a reproduction ending in the middle of the section.

When no chapter point is detected from the chapter point search range (NO in Step S107), the reproduction position setting unit 235 searches for a point having a maximum feature amount value (point excluding chapter point) within a range set by adding a predetermined time (fourth time period) before and after the section end time and sets the point as a reproduction end time. At this time, when points having the same feature amount value are detected before and after the section end time, the reproduction position setting unit 235 sets a latter one of the points as the reproduction end time (Step S108).

Here, in the search range of a point having a maximum feature amount value, time lengths of the search range (fourth time period) added before and after the section end time may be the same, but it is desirable to set the time length of the search range added before the section end time to be shorter than that of the search range added after the section end time, like setting the time length of the search range added before the section end time to 15 seconds and setting the time length of the search range added after the section end time to 30 seconds, for example.

It should be noted that also in this case, the length of the search range of a point having a maximum feature amount value may be the same as that of the chapter point search range, or may be narrower or wider than the chapter point search range.

When a chapter point is detected from the chapter point search range (YES in Step S107), the reproduction position setting unit 235 sets the chapter point closest to the section end time as the reproduction end time (Step S109).

More specifically, the reproduction end time is set according to the following rules:
1. When a chapter point exists only in a search range before a section end time, that chapter point is set as a reproduction end time.
2. When a chapter point exists only in a search range after a section end time, that chapter point is set as a reproduction end time.
3. When chapter points exist in search ranges before and after a section end time, the chapter point closer to the section end time is set as a reproduction end time.
4. When lengths from a section end time regarding chapter points before and after the section end time are the same, the chapter point after the section end time is set as a reproduction end time.

The reproduction end time is set according to the rules described above.

After that, reproduction is performed using the range from the reproduction start time to the reproduction end time set by the reproduction position setting unit 235 as a reproduction range of the section selected by the user (Step S110).

(Specific Operation Example 1)

Next, a specific example of an operation of setting a reproduction range by allocating, as a reproduction start position and reproduction end position, two chapter points to a section start time and section end time given by post metadata will be described.

FIG. 8 is a diagram showing section names given by the post metadata and relationships among section start times, chapter points, and reproduction start times.

Figure 9:
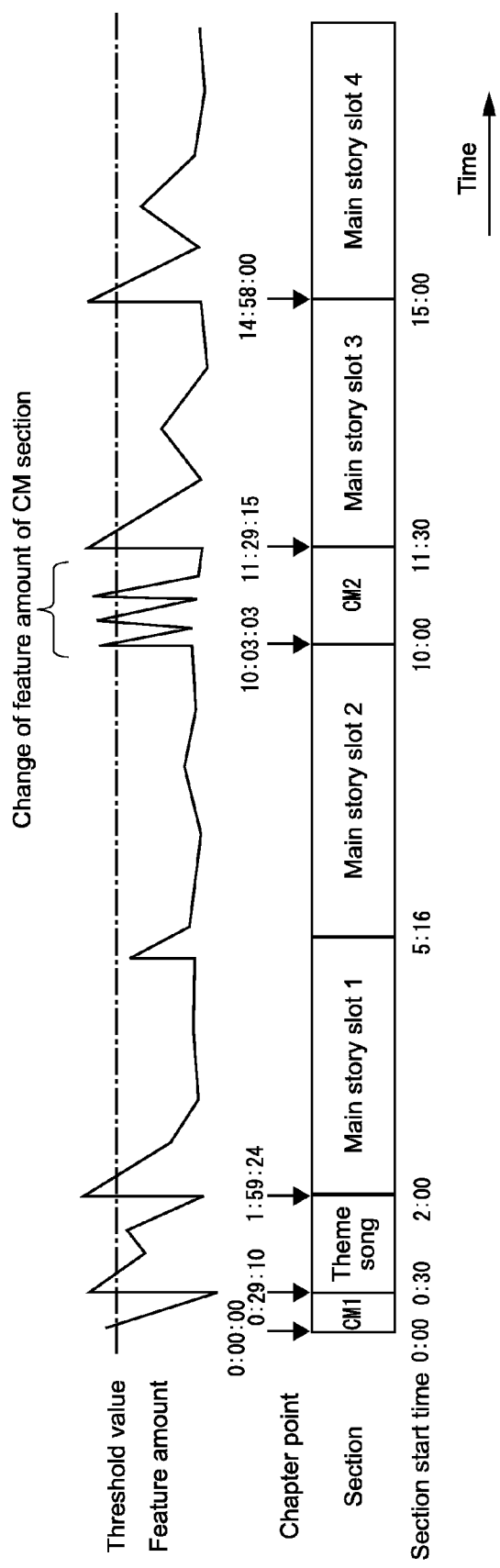
FIG. 9 is a diagram showing a relationship among section start times of the sections, feature amounts, and the chapter points given by the post metadata on a time axis.

FIG. 9 is a diagram showing a relationship among the section start times, feature amounts, and chapter points of the sections given by the post metadata on a time axis.

In principle, there is no guarantee that all sections given by post metadata are generated as chapter points. In this regard, the examples shown in FIGS. 6 and 7 show a case where there is no chapter point corresponding to a section start time of a "main story slot 2" section. This is caused when, for example, a feature amount obtained at an actual start time of the "main story slot 2" section has not reached a threshold value for generating a chapter point. It should be noted that the section start time of the "main story slot 2" section is the same as a section end time of a "main story slot 1" section right before the "main story slot 2" section, and the same holds true for other sections.

It should be noted that the section name is a name generated based on information including a field and details described in post metadata, but for brevity of description, generalized names such as "CM 1" and "main story slot 1" are used substitutionally in FIGS. 6 and 7.

Figure 10:
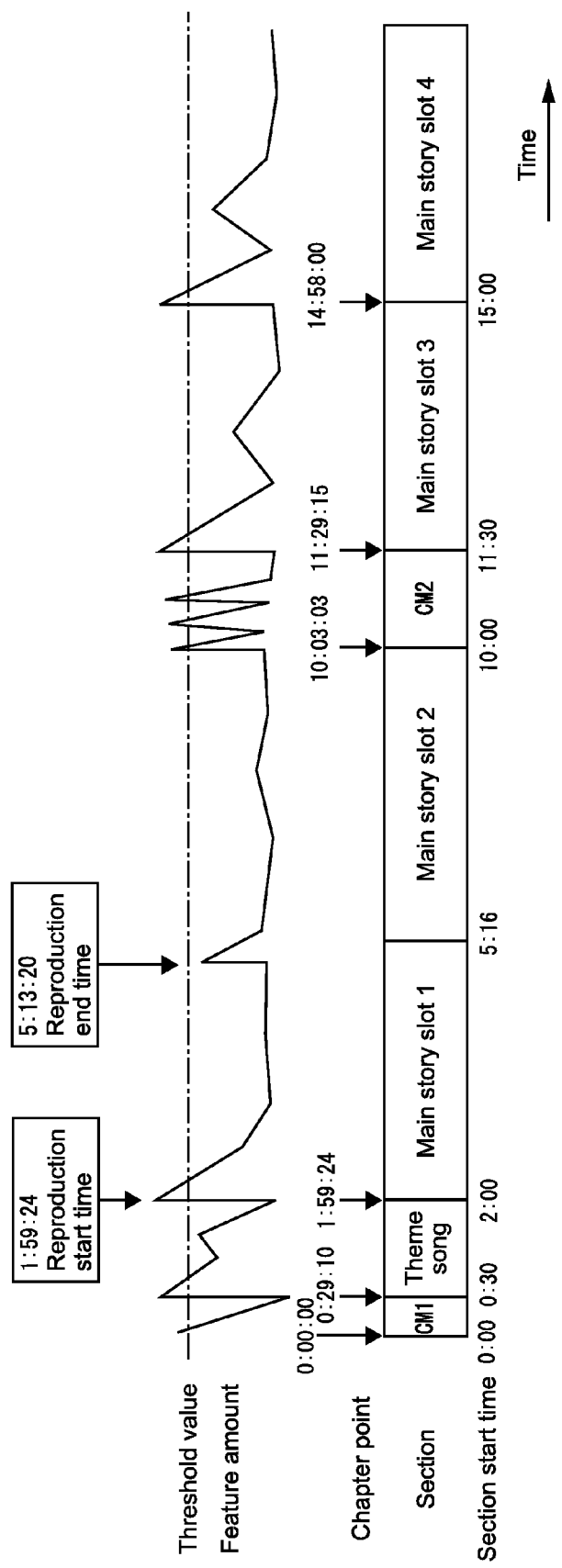
FIG. 10 is a diagram showing a setting example of a reproduction range with respect to a selected section.

FIG. 10 is a diagram showing a setting example of a reproduction range in a case where a reproduction of the "main story slot 1" section is selected by the user.

The section start time of the "main story slot 1" section is "2:00". A chapter point that exists within a range set by adding 30 seconds before the section start time and 15 seconds after the section start time is only "1:59:24". Therefore, the chapter point "1:59:24" is set as the reproduction start time.

Subsequently, the reproduction end time of the "main story slot 1" section is set similarly. In this example, the section end time of the "main story slot 1" section is the same as the section start time of the next "main story slot 2" section, which is "5:16". There is no chapter point that exists within a range set by adding 15 seconds before the section end time and 30 seconds after the section end time. In this regard, the reproduction position setting unit 235 searches for a point with a maximum feature amount value within a range set by adding 15 seconds before the section end time "5:16" and 30 seconds after the section end time "5:16" from correspondence data of the feature amount and program time stored in the database 231, and sets the point as the reproduction end time. FIG. 8 shows a case where "5:13:20" is judged as the reproduction end time.

(Effect of Embodiment)

The embodiment of the present disclosure bears the following effects.

In the recording apparatus 200, by prompting the user to select a section to reproduce from the sections given by post metadata and allocating chapter points having high temporal accuracy to the section start time and section end time of the selected section, the reproduction range of the selected section is set. As a result, a user operability in selecting a section to reproduce and temporal accuracy of a reproduction range of the selected section can be improved.

Further, in the recording apparatus 200, when there is no chapter point to be allocated to the section start time of the selected section, a point having a highest feature amount value within a range set by adding a predetermined time before and after the section start time is set as the reproduction start time. Also for the section end time of the selected section, a point having a highest feature amount value within a range set by adding a predetermined time before and after the section end time is set as the reproduction end time. As a result, even when there is a leakage in generation of chapter points, the reproduction start time and reproduction end time can be favorably set to the section start time and section end time of the selected section.

MODIFIED EXAMPLE 1

Next, a modified example of the embodiment above will be described.

Post metadata of each section of a broadcast program may be structured in a unit of section information, shop information, product information, and CM information.

Figure 11:
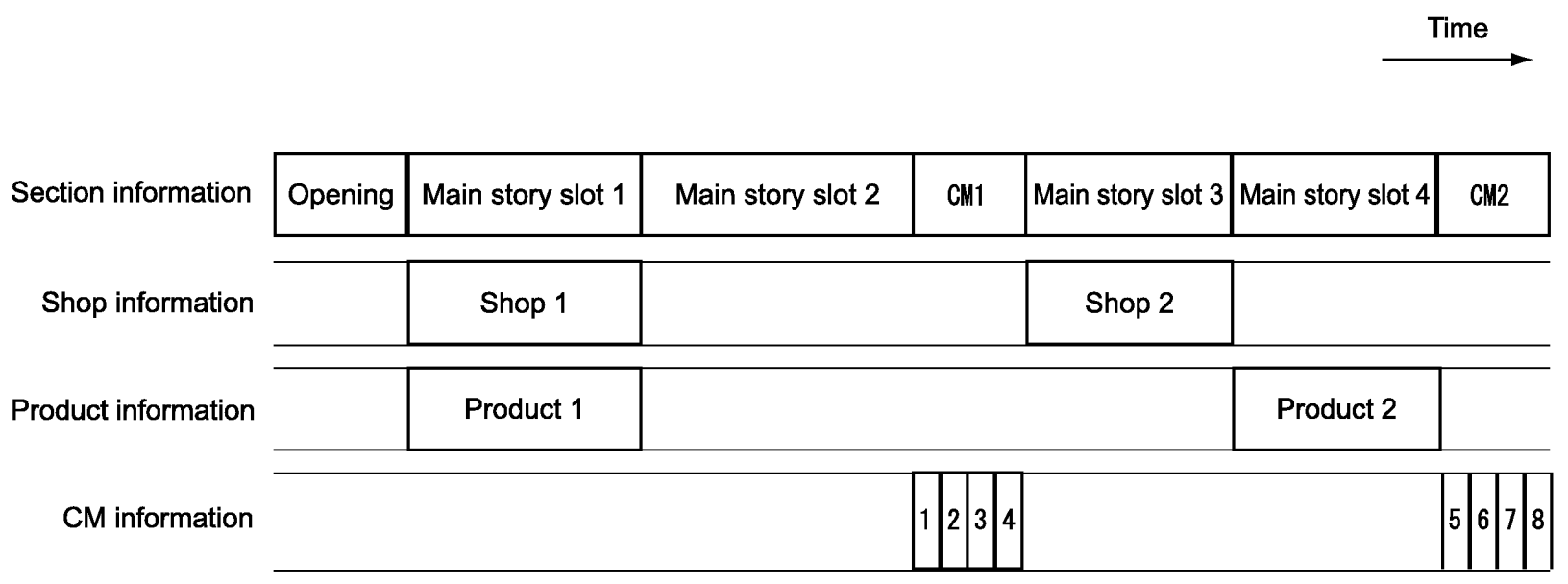

FIG. 11 is a diagram showing an example of a correlation among section information, shop information, product information, and CM information of sections given by post metadata on the time axis according to the modified example. As shown in the figure, section information is defined in each section of the broadcast program, and shop information, product information, and CM information are selectively linked to a part of the section information. It should be noted that FIG. 11 shows that information provided at the same position as the section information on the time axis is linked information.

Figure 12:
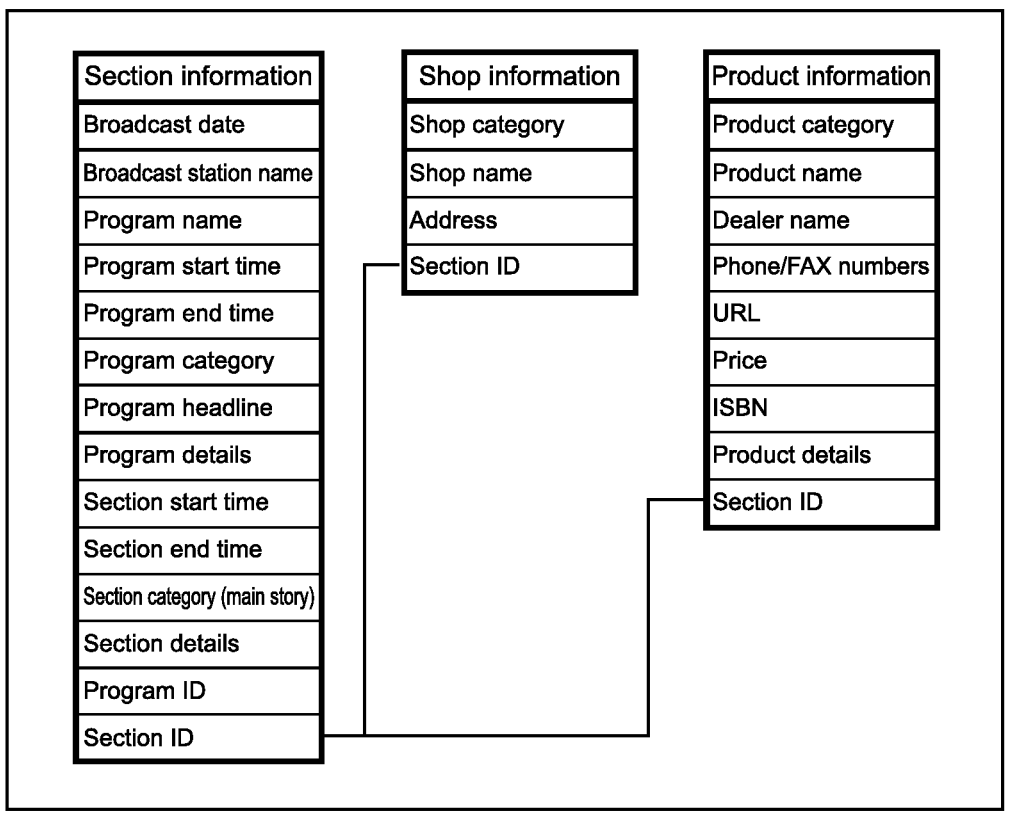
FIG. 12 is a diagram showing a structure of post metadata of a main story section in a broadcast program according to the modified example.

FIG. 12 is a diagram showing a structure of post metadata of a main story section in a broadcast program according to the modified example. The post metadata of the main story section is constituted of the section information, shop information, and product information.

The section information includes a broadcast date, a broadcast station name, a program name, a program start time, a program end time, a program category, a program headline, program details, a section start time, a section end time, a section category, section details, a program ID, and a section ID. It should be noted that post metadata in a section unit according to the first embodiment may take the same structure as the section information.

The shop information is information on a shop that appears in a main story of the broadcast program. The information on a shop is constituted of a shop category, a shop name, an address, a section ID for linking with section information, and the like.

The product information is information on a product that appears in the main story. The information on a product is constituted of a product category, a product name, a dealer name, phone/FAX numbers, a URL (Uniform Resource Locator), a price, an ISBN (International Standard Book Number), product details, a section ID for linking with section information, and the like.

In other words, the shop information and product information are linked with the section information by the section IDs.

Figure 13:
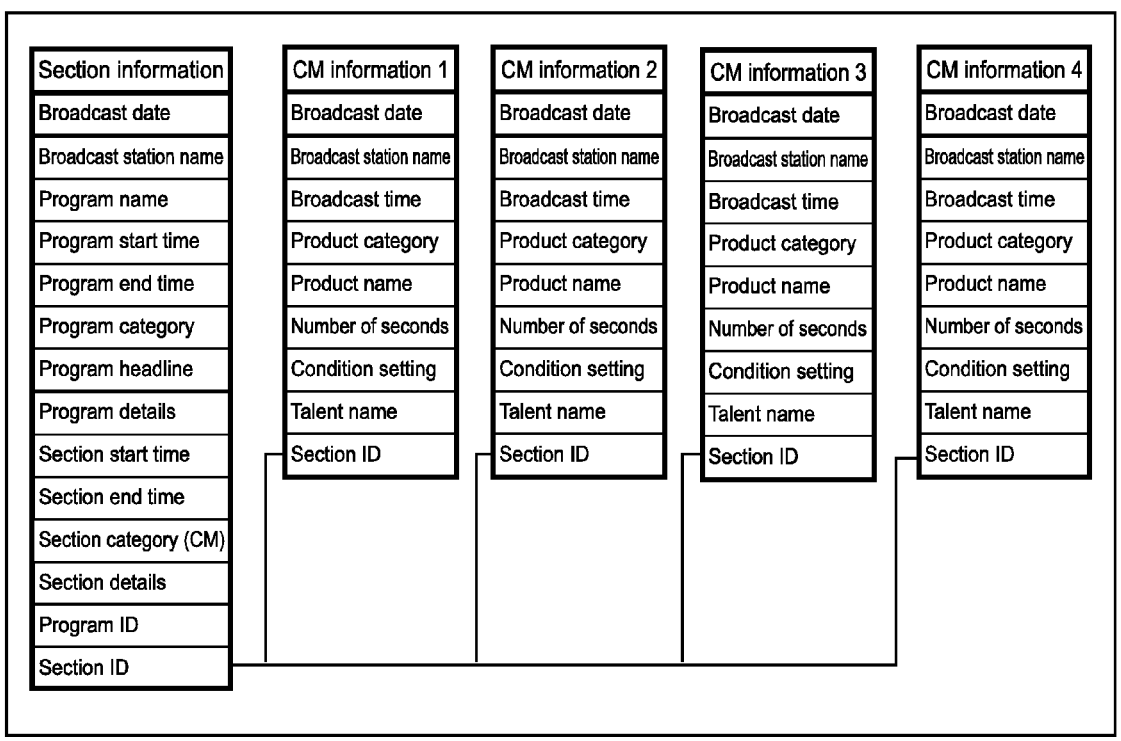
FIG. 13 is a diagram showing a structure of the post metadata of a CM section in the broadcast program according to the modified example.

FIG. 13 is a diagram showing a structure of post metadata of a CM section in the broadcast program according to the modified example. As shown in the figure, the post metadata of the CM section is constituted of section information and CM information.

The structure of the section information is as described above.

The CM information is information on individual CMs. The CM information is constituted of a broadcast date, a broadcast station name, a broadcast time, a product category, a product name, the number of seconds, a condition setting (location, item, etc. that appear in CM), a talent name, a section ID for linking with section information, and the like.

In other words, the CM information is linked with the section information by the section ID.

The CM information includes information on a broadcast time indicating a CM start time and the number of seconds indicating a CM length. A value obtained by adding the number of seconds to the broadcast time becomes a CM end time. In other words, the CM information practically includes information on the CM start time and CM end time. When a plurality of CMs are inserted into one CM section, pieces of CM information of the plurality of CMs are linked to the section information of that CM section.

As described above, according to the post metadata of the modified example, one or more pieces of shop information and product information can be linked with the section information of the main story section, and one or more pieces of CM information can be linked with the section information of the CM section.

When a CM start time and CM end time of each CM are given by post metadata as described above, by allocating two chapter points generated from the feature amount to the CM start time and CM end time in a CM unit, a reproduction in a unit of a CM selected by the user can be performed with high temporal accuracy.

In this case, excluding the CM section judgment rule adopted in the method of generating a chapter point according to the first embodiment, a change point having a large video feature amount is generated as a chapter point.

It should be understood by those skilled in the art that various modifications, combinations, sub-combinations and alterations may occur depending on design requirements and other factors insofar as they are within the scope of the appended claims or the equivalents thereof.

The present disclosure may also take the following structures:

(1) An information processing apparatus, including:
   a recording unit configured to record a program;
   a chapter generation unit configured to generate one or more chapter points based on a feature amount of the recorded program;
   a metadata acquisition unit configured to acquire metadata on the program, that includes information on a start time and end time of each section sectioning the program; and
   a setting unit configured to allocate, when a section to be reproduced in the recorded program is designated, two different chapter points to a start time and end time of the section given by the acquired metadata, and set an interval between the two chapter points as a reproduction range of the designated section.

(2) The information processing apparatus according to (1) above,
   in which the setting unit sets, as a start time of the reproduction range, a first chapter point closest to the start time of the designated section within a range set by adding a predetermined first time period before and after the start time of the designated section, and sets, as an end time of the reproduction range, a second chapter point closest to the end time of the designated section within a range set by adding a predetermined second time period before and after the end time of the designated section.

(3) The information processing apparatus according to (2) above,
   in which the first time period added before the start time of the designated section is longer than the first time period added after the start time of the designated section, and the second time period added before the end time of the designated section is shorter than the second time period added after the end time of the designated section.

(4) The information processing apparatus according to (2) or (3) above,
   in which the setting unit sets, as the start time of the reproduction section, when the first chapter point does not exist within the range set by adding the predetermined first time period before and after the start time of the designated section, a point having a maximum feature amount value within a range set by adding a predetermined third time period before and after the start time of the designated section, and sets, as the end time of the reproduction section, when the second chapter point does not exist within the range set by adding the predetermined second time period before and after the end time of the designated section, a point having a maximum feature amount value within a range set by adding a predetermined fourth time period before and after the end time of the designated section.

(5) The information processing apparatus according to (4) above,
   in which the third time period added before the start time of the designated section is longer than the third time period added after the start time of the designated section, and the fourth time period added before the end time of the designated section is shorter than the fourth time period added after the end time of the designated section.

(6) The information processing apparatus according to any one of (1) to (5) above,
   in which the chapter generation unit generates, with a plurality of commercials successively inserted into the program being set as one CM section, at least the one or more chapter points at a start point and end point of the CM section.

(7) The information processing apparatus according to any one of (1) to (6) above, further including
   a section selection screen generation unit configured to generate, based on the acquired metadata, a selection screen for prompting a user to select a section to be reproduced in the recorded program.

What is claimed is:

1. An information processing apparatus, comprising:
   a recording unit configured to record a program;
   a chapter generation unit configured to generate one or more chapter points based on a feature amount of the recorded program;
   a metadata acquisition unit configured to acquire metadata on the program, that includes information on a start time and end time of each section sectioning the program; and
   a setting unit configured to allocate, when a section to be reproduced in the recorded program is designated, two different chapter points to a start time and end time of the section given by the acquired metadata, and set an interval between the two chapter points as a reproduction range of the designated section,
   wherein the setting unit is configured to set, as a start time of the reproduction range, a first chapter point closest to the start time of the designated section within a range set by adding a predetermined first time period before and after the start time of the designated section.

2. The information processing apparatus according to claim 1, wherein the setting unit is configured to set, as an end time of the reproduction range, a second chapter point closest to the end time of the designated section within a range set by adding a predetermined second time period before and after the end time of the designated section.

3. The information processing apparatus according to claim 2, wherein the first time period added before the start time of the designated section is longer than the first time period added after the start time of the designated section, and the second time period added before the end time of the designated section is shorter than the second time period added after the end time of the designated section.

4. The information processing apparatus according to claim 3, wherein the setting unit is configured to set, as the start time of the reproduction section, when the first chapter point does not exist within the range set by adding the predetermined first time period before and after the start time of the designated section, a point having a maximum feature amount value within a range set by adding a predetermined third time period before and after the start time of the designated section, and set, as the end time of the reproduction section, when the second chapter point does not exist within the range set by adding the predetermined second time period before and after the end time of the designated section, a point having a maximum feature amount value within a range set by adding a predetermined fourth time period before and after the end time of the designated section.

5. The information processing apparatus according to claim 4, wherein the third time period added before the start time of the designated section is longer than the third time period added after the start time of the designated section, and the fourth time period added before the end time of the designated section is shorter than the fourth time period added after the end time of the designated section.

6. The information processing apparatus according to claim 5, wherein the chapter generation unit is configured to generate, with a plurality of commercials successively inserted into the program being set as one CM section, at least the one or more chapter points at a start point and end point of the CM section.

7. The information processing apparatus according to claim 6, further comprising a section selection screen generation unit configured to generate, based on the acquired metadata, a selection screen for prompting a user to select a section to be reproduced in the recorded program.

8. An information processing method, comprising:
generating, by a chapter generation unit, one or more chapter points based on a feature amount of a program;
acquiring, by a metadata acquisition unit, metadata on the program, that includes information on a start time and end time of each section sectioning the program;
allocating, by a setting unit, when a section to be reproduced in the program recorded in an information processing apparatus is designated by a user, two different chapter points to a start time and end time of the section given by the acquired metadata, and setting an interval between the two chapter points as a reproduction range of the designated section; and
setting, by the setting unit, as a start time of the reproduction range, a first chapter point closest to the start time of the designated section within a range set by adding a predetermined first time period before and after the start time of the designated section.

9. A non-transitory computer-readable storage medium having a set of instructions stored therein which causes a computer to function as:
a chapter generation unit configured to generate one or more chapter points based on a feature amount of a program;
a metadata acquisition unit configured to acquire metadata on the program, that includes information on a start time and end time of each section sectioning the program; and
a setting unit configured to allocate, when a section to be reproduced in the program recorded in an information processing apparatus is designated, two different chapter points to a start time and end time of the section given by the acquired metadata, and set an interval between the two chapter points as a reproduction range of the designated section,
wherein the setting unit is configured to set, as a start time of the reproduction range, a first chapter point closest to the start time of the designated section within a range set by adding a predetermined first time period before and after the start time of the designated section.

* * * * *